United States Patent
Kiemel et al.

(10) Patent No.: US 10,188,984 B2
(45) Date of Patent: Jan. 29, 2019

(54) PROCESS FOR REMOVING OXIDISABLE GASEOUS COMPOUNDS FROM A GAS MIXTURE BY MEANS OF A PLATINUM-CONTAINING OXIDATION CATALYST

(71) Applicant: Heraeus Deutschland GmbH & Co. KG, Hanau (DE)

(72) Inventors: Rainer Kiemel, Langenselbold (DE); Santiago Casu, Hanau (DE); Martina Kemmer, Kahl (DE); Nico Lochner, Hasselroth (DE); Richard Walter, Alzenau (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 0 days.

(21) Appl. No.: 15/487,557

(22) Filed: Apr. 14, 2017

(65) Prior Publication Data
US 2017/0304771 A1 Oct. 26, 2017

(30) Foreign Application Priority Data

Apr. 20, 2016 (EP) .................................. 16166200

(51) Int. Cl.
| | | |
|---|---|---|
| *B01D 53/86* | (2006.01) | |
| *B01D 53/88* | (2006.01) | |
| *B01J 21/04* | (2006.01) | |
| *B01J 23/42* | (2006.01) | |
| *B01J 35/00* | (2006.01) | |
| *B01J 35/02* | (2006.01) | |
| *B01J 37/02* | (2006.01) | |
| *B01J 37/08* | (2006.01) | |
| *B01J 23/63* | (2006.01) | |
| *B01J 29/068* | (2006.01) | |
| *B01J 35/04* | (2006.01) | |

(52) U.S. Cl.
CPC ......... *B01D 53/885* (2013.01); *B01D 53/864* (2013.01); *B01D 53/8668* (2013.01); *B01D 53/8671* (2013.01); *B01D 53/8678* (2013.01); *B01J 21/04* (2013.01); *B01J 23/42* (2013.01); *B01J 23/63* (2013.01); *B01J 29/068* (2013.01); *B01J 35/0006* (2013.01); *B01J 35/02* (2013.01); *B01J 35/04* (2013.01); *B01J 37/0203* (2013.01); *B01J 37/0236* (2013.01); *B01J 37/0248* (2013.01); *B01J 37/086* (2013.01); *B01D 2255/1021* (2013.01); *B01D 2255/2092* (2013.01); *B01D 2257/108* (2013.01); *B01D 2257/502* (2013.01); *B01D 2257/702* (2013.01); *B01D 2257/708* (2013.01); *B01D 2257/7022* (2013.01); *B01D 2257/7025* (2013.01); *B01D 2258/0258* (2013.01); *B01D 2258/0266* (2013.01); *B01D 2258/0275* (2013.01); *B01D 2258/06* (2013.01); *Y02C 20/20* (2013.01)

(58) Field of Classification Search
None
See application file for complete search history.

(56) References Cited

U.S. PATENT DOCUMENTS

| | | | | |
|---|---|---|---|---|
| 2001/0043896 | A1* | 11/2001 | Domesle | B01D 53/944 423/213.5 |
| 2011/0044874 | A1* | 2/2011 | Dang | B01D 53/864 423/240 S |
| 2015/0232405 | A1* | 8/2015 | Walter | C07C 51/418 562/597 |

FOREIGN PATENT DOCUMENTS

WO WO-2011066009 A2 6/2011

* cited by examiner

*Primary Examiner* — Anita Nassiri-Motlagh
(74) *Attorney, Agent, or Firm* — Blank Rome LLP

(57) ABSTRACT

Process for catalytic oxidative removal of at least one oxidisable gaseous compound from a gas mixture comprising the at least one oxidisable gaseous compound as well as oxygen through the use of an oxidation catalyst, whereby the gas mixture is not a combustion flue gas, characterised in that the oxidation catalyst was produced through the use of at least one exothermic-decomposing platinum precursor.

17 Claims, No Drawings

PROCESS FOR REMOVING OXIDISABLE GASEOUS COMPOUNDS FROM A GAS MIXTURE BY MEANS OF A PLATINUM-CONTAINING OXIDATION CATALYST

RELATED APPLICATION

This application claims benefit under 35 U.S.C. § 119(a) to European Patent Application No. 16 166 200.2, filed Apr. 20, 2016, which is hereby incorporated by reference in its entirety.

The present invention relates to a process for catalytic oxidative removal of at least one oxidisable gaseous compound from a mixture of gases.

Catalytic oxidative removal of oxidisable gaseous compounds from mixtures of gases is used, in practical application, for example in the cleaning of industrial exhaust gases or exhaust air to remove harmful and/or odorous gaseous compounds or, also, in the production of pure gases or mixtures of gases by removing oxidisable gaseous impurities from these gases. The removal of gaseous hydrocarbons from exhaust air shall be mentioned here for exemplary purposes; this involves a catalytic oxidative conversion of the hydrocarbons with oxygen to form $CO_2$ and water.

For example platinum-containing fixed-bed catalysts are used as oxidation catalysts. Said oxidation catalysts usually comprise porous catalyst supports whose pore surface comprises at least one catalytically active platinum species. To produce said platinum-containing fixed-bed catalysts, it is customary to use dissolved platinum salts or platinum complex compounds (e.g. platinum nitrate, platinum chlorides) as platinum precursors. The application of a dissolved platinum precursor to the surface of a catalyst support is generally called impregnating. Platinum precursor solutions can be applied to porous catalyst supports by a variety of techniques, such as, e.g., capillary-controlled (incipient wetness) or diffusion-controlled impregnation. Subsequently, the platinum precursors can be affixed by drying on the catalyst support and can then be decomposed to form the catalytically active platinum species by calcination at elevated temperatures.

If platinum-chloro compounds are used as platinum precursor, it is usually necessary to wash out residual chloride from the calcined oxidation catalyst. An additional reducing treatment of the calcined oxidation catalyst may be required. This can take place, for example, in the gas phase by means of reducing gases (e.g. $H_2$) or in aqueous phase by means of suitable reducing agents.

WO2011/066009 A2 discloses both platinum- and ruthenium-containing oxidation catalysts that can used for removing volatile organic halogen compounds from an exhaust gas flow.

There is a continuing need for improved processes for catalytic oxidative removal of oxidisable gaseous compounds from mixtures of gases. Accordingly, it is desirable to be able to perform said catalytic oxidation at the lowest light-off temperature possible (start-up temperature).

It is the object of the present invention to provide a process for catalytic oxidative removal of oxidisable gaseous compounds from gas mixtures as an improvement over the prior art.

The object is met by a process for catalytic oxidative removal of at least one oxidisable gaseous compound from a gas mixture comprising the at least one oxidisable gaseous compound as well as oxygen through the use of an oxidation catalyst, whereby the gas mixture is not a combustion flue gas, characterised in that the oxidation catalyst was produced through the use of at least one exothermic-decomposing platinum precursor.

The term "exothermic-decomposing platinum precursor" is used herein. The term "exothermic-decomposing" used for reasons of brevity means, in more specific terms: "exothermic-decomposing by the action of heat" or "exothermic-decomposing by thermal action". In other words, the term "exothermic-decomposing platinum precursor" means that the decomposition of the at least one exothermic-decomposing platinum precursor by heat is associated with the release of reaction heat.

In one embodiment, the exothermic decomposition by heat of the at least one exothermic-decomposing platinum precursor can take place in the temperature range from, for example, 50 to 500° C.; in another embodiment, the at least one exothermic-decomposing platinum precursor releases reaction heat upon its thermal decomposition in the temperature range of, for example, 150 to 200° C. Accordingly, said embodiments can be platinum precursors that can be decomposed exothermically in the temperature range of, for example, 50 to 500° C. or, for example, 150 to 200° C.

Whether or not a platinum precursor can be decomposed exothermically can be determined, for example, by means of a DSC measurement (differential scanning calorimetry), for example at a heating rate of 5 or 10° C. per minute. It can be expedient to perform the DSC measurement in an inert gas, for example in nitrogen or argon, in order to prevent possible falsification of the measuring result by the admission of air to the sample of a corresponding platinum precursor. In other respects, a person skilled in the art knowing of a platinum precursor to be measured will select a sample crucible that is chemically inert with respect to a sample thereof, for example a sample crucible made of gold.

In the DSC diagram (heat flow plotted over the temperature), an exothermic decomposition shows an exothermic signal. The opposite is true in case of an endothermic decomposition, i.e. heat is "being consumed" during an endothermic decomposition.

For the purposes of characterisation by means of DSC, solutions of platinum precursors can be dried gently until their weight is constant while preventing decomposition, in particular while preventing decomposition forming a catalytically active platinum species.

The gas mixture contains at least one oxidisable gaseous compound or, to be more specific, one or more different oxidisable gaseous compound(s).

The at least one oxidisable gaseous compound is a compound that can be removed from the gas mixture by way of a catalytic oxidation.

To prevent any confusion in this regard, the term "oxidation catalyst" as used herein shall be understood to mean a catalyst for the purpose of an essentially complete oxidation or total oxidation. The wording, "essentially complete oxidation or total oxidation", shall be understood to mean that any carbon and/or hydrogen contained in the at least one oxidisable gaseous compound is oxidised essentially or completely, for example at a rate of 99% or more up to 100%, forming $CO_2$ or water. In this regard, a person skilled in the art does not understand the inventive process to be a catalytic oxidation process in the scope of a chemical synthesis, but rather as a process for catalytic oxidative removal of at he at least one oxidisable gaseous compound from the gas mixture in the scope of an essentially complete oxidation or total oxidation of the at least one oxidisable gaseous compound to be removed from the gas mixture.

If required by circumstances or if expedient, steps for removal of gaseous oxidation products thus formed, such as, for example, in particular $CO_2$ and/or water, can follow after the process according to the invention.

The gas mixture is not a combustion flue gas, i.e. it is neither an exhaust gas from combustion processes nor an exhaust gas from a combustion motor. Preferably, the gas mixture is a non-explosive gas mixture. The term "non-explosive" shall not be understood in absolute terms in this context. Accordingly a non-explosive gas mixture shall be understood to be one that does not lead to an explosion during the implementation of the process according to the invention and which does allow the implementation of the process without accompanying destruction of the oxidation catalyst because of an explosion.

The at least one oxidisable gaseous compound that is contained in and/or to be removed from the gas mixture can be one or more so-called VOCs (volatile organic compounds), i.e. gaseous or volatile organic compounds, such as, for example, organic compounds with a boiling point of, for example, up to 300° C. or organic compounds showing sublimation behaviour. Typical examples of said VOCs are hydrocarbons and organic solvents of the kind used, for example, in chemical production, in the production or processing of lacquers or adhesives, in cleaning processes, etc. Hydrocarbons can get into exhaust air, for example, during the handling of fossil fuels, for example during the production or distribution thereof. Other examples of VOCs include organic residual monomers from the production and processing of polymers or odourants as are generated, for example, in the food industry (food production, animal fattening, roasting plants, fermentation processes, etc.).

In a preferred embodiment, the gas mixture contains no halogen-containing organic compounds.

However, the at least one oxidisable gaseous compound that is contained in and/or to be removed from the gas mixture in the process according to the invention is not limited to gaseous or volatile organic compounds. The at least one oxidisable gaseous compound can just as well be, for example, inorganic oxidisable gaseous compounds, such as, e.g., carbon monoxide or hydrogen.

As shall be further illustrated below, the quantitative fraction of the at least one oxidisable gaseous compound in the gas mixture can vary quite strongly in the individual case and can thus cover a broad range. Accordingly, the quantitative fraction of the at least one oxidisable gaseous compound in the gas mixture can be in the range of, for example, 10 vol.-ppb to 50,000 vol.-ppm.

Aside from the at least one oxidisable gaseous compound, the gas mixture also comprises oxygen. The gas mixture can further comprise at least one further gas, in particular inert gas. The at least one further inert gas can be selected, in particular, from nitrogen, noble gases, and $CO_2$.

The quantitative fraction of oxygen in the gas mixture is, in particular, designed to be at least adequate, by stoichiometry, for complete oxidation of the at least one oxidisable gaseous compound. The oxygen contained in the gas mixture can have been added deliberately to the gas mixture or it is an ingredient of the gas mixture from the beginning.

Examples of gas mixtures containing one or more oxidisable gaseous compounds that can be removed by catalytic oxidation are exhaust air, inert gases or process gases that contain the corresponding loads or impurities. Since a plethora of VOCs and/or odourants are environmental pollutants, the existing legal or official provisions require these substances to be released not at all or in very low quantities into the ambient air and/or atmosphere and these substances therefore need to be removed from contaminated exhaust air to the extent possible or required. However, the process according to the invention cannot only be used for exhaust air cleaning, but also for the cleaning of inert or process gas. Inert or process gas cleaned according to the process according to the invention can be recycled in purified form—if applicable, after separation of gaseous oxidation products such as, in particular, $CO_2$ and/or water. The process according to the invention can also be used to remove traces of gases, such as hydrogen, CO, hydrocarbons, etc., to produce pure or ultrapure gases and/or industrial gases ($O_2$, $N_2$, $CO_2$, noble gases).

Some examples of different types of gas mixtures from which the at least one oxidisable gaseous compound can be removed by means of the process according to the invention, are listed in the following:

1. The gas mixture can be, for example, exhaust air needing to be cleaned. Said exhaust air can originate, e.g., from chemical cleaning processes, lacquer or adhesives production or processing, chemical production or the food sector. The quantitative fraction of the at least one oxidisable gaseous compound in said exhaust air is, for example, in the range of 10-50,000 vol.-ppm with the remainder usually being common air.
2. The gas mixture can be, for example, contaminated, but otherwise inert process gas (e.g. nitrogen) with corresponding added oxygen. The process gas can originate, e.g., from a process for after-treatment and release of VOCs such as residual monomers, oligomers, solvent, etc., from polymers (PET). The quantitative fraction of the at least one oxidisable gaseous compound in the gas mixture is, for example, in the range of 10-10,000 vol.-ppm in this context. In this context, the quantitative fraction of oxygen in the gas mixture corresponds to at least the amount required by stoichiometry for complete oxidation of the at least one oxidisable gaseous compound, and is added deliberately, as has been stated before. In this context, the amount of oxygen added is usually regulated by means of an analysis, for example by means of a lambda probe or through a direct oxygen measurement after cleaning of the gas mixture. The quantitative fraction of the otherwise inert process gas accounts for the remainder of the gas mixture.
3. The gas mixture can be, for example, inert gas needing to be cleaned (e.g. nitrogen, noble gases, $CO_2$) with corresponding added oxygen. Pure inert gas is used as process gas in numerous applications. The quantitative fraction of the at least one oxidisable gaseous compound in the gas mixture is often in the trace range, for example in the range of 1-10,000 vol.-ppm, in this context. In this context, the quantitative fraction of oxygen in the gas mixture corresponds to at least the amount required by stoichiometry for complete oxidation of the at least one oxidisable gaseous compound, and is added deliberately, as has been stated before. In this context, the amount of oxygen added is regulated by means of an analysis, for example by means of a lambda probe or through a direct oxygen measurement after cleaning of the gas mixture. The quantitative fraction of the inert process gas accounts for the remainder of the gas mixture.
4. The gas mixture can be, for example, air needing to be cleaned. Pure air is also used in a multitude of applications, including in air separation. The quantitative fraction of the at least one oxidisable gaseous compound in the gas mixture is often in the trace range, for example in the range of 1-1,000 vol.-ppm, in this context with the remainder usually being common air.

5. The gas mixture can be, for example, oxygen needing to be cleaned. Pure oxygen is also used as process gas in a multitude of applications. The quantitative fraction of the at least one oxidisable gaseous compound in the gas mixture is, for example, in the range of 100 vol.-ppb-1,000 vol.-ppm in this context. The quantitative fraction of the oxygen accounts for the remainder of the gas mixture.

Depending on its composition, the gas mixture is fed into the oxidation catalyst at a temperature in the range of, for example, 0 to 600° C. The temperature is selected appropriately, in particular, such that the complete oxidation of the at least one oxidisable gaseous compound is essentially or completely assured. Depending on the type of the at least one oxidisable gaseous compound contained in the gas mixture, it can therefore be expedient to feed the gas mixture appropriately pre-heated into the oxidation catalyst.

The gas mixture can be fed into the oxidation catalyst at a space velocity in the range of, for example, 1,000-200,000 $h^{-1}$ (standard conditions; gas mixture volume per hour relative to catalyst volume).

The process according to the invention utilises an oxidation catalyst that was produced through the use of at least one exothermic-decomposing platinum precursor. The oxidation catalyst is usually a fixed-bed catalyst that comprises one or more porous catalyst supports and at least one catalytically active platinum species.

The oxidation catalyst can be present, for example, as a washcoat-coated or uncoated monolith catalyst, as a bulk catalyst comprising washcoat-coated or uncoated bulk form bodies or as a washcoat-coated metal honeycomb or metal mesh catalyst.

The at least one catalytically active platinum species originates, at least in part, from the at least one exothermic-decomposing platinum precursor or, to be more specific, the platinum of the at least one catalytically active platinum species contained in the oxidation catalyst used in the process according to the invention originates, at least in part, for example at a level of 30% or more, preferably completely, from the at least one exothermic-decomposing platinum precursor.

The at least one catalytically active platinum species that originates, at least in part, from the at least one exothermic-decomposing platinum precursor can be generated by exothermic decomposition of the at least one exothermic-decomposing platinum precursor and it can be present as elemental platinum and/or as platinum compound (e.g. platinum oxide) on the porous catalyst support(s) of the oxidation catalyst used in the process according to the invention, in particular on the pore surface of the porous catalyst support(s) of the oxidation catalyst used in the process according to the invention.

Typical monolith catalysts are based, for example, on a honeycomb body, for example on a honeycomb body made of refractory material or a ceramic honeycomb body, having a multitude of channels arranged next to each other or an open-pore foam structure with hollow spaces that are connected to each other through which the gases can flow.

In other words, a monolith catalyst can itself be the porous catalyst support and/or can be coated with a washcoat, whereby the washcoat layer contains porous catalyst supports in the form of porous particles. In this context, the at least one catalytically active platinum species can be situated on the pore surface of the porous ceramic honeycomb body and/or of the porous particles in the washcoat layer.

In case of bulk catalysts, the porous catalyst supports are present as form bodies (such as, e.g., granules, pellets or extrudates such as cylinders, rings, spheres, cuboids, platelets). The diameters or the sizes of said bulk form bodies can be in the range of, for example, approximately 1 to 20 millimeters. In other words, the bulk form bodies can themselves be porous catalyst supports and/or can be coated with a washcoat, whereby the washcoat layer contains porous catalyst supports in the form of porous particles. In this context, the at least one catalytically active platinum species can be situated on the pore surface of the porous bulk form bodies and/or of the porous particles in the washcoat layer, though they commonly are situated, in particular, on the pore surface of the porous bulk form bodies.

In the case of metal honeycomb or metal mesh catalysts, the metal surface generally is coated with a washcoat, whereby the washcoat layer contains porous catalyst supports in the form of porous particles. The at least one catalytically active platinum species usually is situated on the pore surface of the porous particles in the washcoat layer.

Well known to a person skilled in the art, the term "washcoat" has been mentioned repeatedly herein; one needs to distinguish between a washcoat slurry and a washcoat layer applied from the same. A washcoat slurry is a liquid coating composition, usually in the form of an aqueous suspension that contains, aside from water, porous catalyst support particles with particle sizes in the range of, for example, 2-100 μm.

Concerning the selection of materials for the porous catalyst support particles, the same applies as in the selection of materials for porous catalyst supports, which is illustrated in more detail below.

Washcoat or washcoat slurry can exist in two fundamentally different embodiments.

In the one embodiment, said washcoat suspension can contain one or more noble metal precursors from which catalytically active noble metal species are formed after application, drying and calcination of the washcoat that was previously applied to a substrate. In this context, the noble metal precursor can be contacted to the porous catalyst support particles forming the ingredients of the washcoat by means of one of the impregnating methods mentioned below. In this context, the impregnated porous catalyst support particles can have been produced separately, i.e. can have been impregnated, dried and calcined, and thus fully configured catalytically active noble metal species can be incorporated into the washcoat slurry. Alternatively, it is feasible to implement the impregnating step as a process step of the washcoat slurry, whereby the drying and calcination take place only after application of the washcoat slurry, i.e. the catalytically active noble metal species is formed only during the calcination of the washcoat layer applied from the washcoat slurry. In the present invention, the noble metal precursor or precursors and/or the catalytically active noble metal species formed therefrom comprises or is the at least one exothermic-decomposing platinum precursor and/or the at least one catalytically active platinum species formed therefrom during calcination.

In the other embodiment, a washcoat slurry can be formulated to be free of any noble metal precursors and can be applied, dried and calcined as such. For configuring the porous catalyst support particles present in the calcined washcoat layer with catalytically active noble metal species, it is necessary in this context to contact noble metal precursor (usually in the form of an aqueous solution) in a separate process step with the washcoat layer, which is still noble metal-free, but is already calcined, by means of impregnating and to form the catalytically active noble metal species after drying and calcination. In the present invention, the noble metal precursor or precursors and/or the catalytically active noble metal species formed therefrom comprises or is the at least one exothermic-decomposing platinum precursor and/or the at least one catalytically active platinum species formed therefrom during calcination.

It is common to the various types of oxidation catalysts that can be used in the process according to the invention that they comprise one or more porous catalyst supports and at least one catalytically active platinum species that originates, at least in part, from the at least one exothermic-decomposing platinum precursor.

The platinum content of the oxidation catalyst used in the process according to the invention is, for example, 0.05 to 25 g per liter of catalyst volume.

Any procedure that is common in the prior art and known to a person skilled in the art can be used for producing of porous catalyst supports with at least one catalytically active platinum species, namely contacting of the porous catalyst support(s) to a solution of a platinum precursor, followed by drying and subsequent calcination of the thus impregnated catalyst support(s) while forming the catalytically active platinum species on the porous catalyst support(s). In the case of the present invention, this means that a solution, preferably an aqueous solution, of at least one exothermic-decomposing platinum precursor can be contacted to the porous catalyst support(s). In this context, the at least one exothermic-decomposing platinum precursor can be applied to the porous catalyst support(s). The application of the at least one exothermic-decomposing platinum precursor, also called impregnation, can take place by means of various procedures.

For example, the solution of the at least one exothermic-decomposing platinum precursor can be soaked up into the porous catalyst support(s) driven by capillary forces such that the volume of the solution corresponds approximately to the pore volume of the porous catalyst support(s) (incipient witness method). The porous catalyst support(s) can be dried following the impregnation. Said drying step takes place, preferably, at temperatures in the range of 20 to 150° C. and can serve to affix the at least one exothermic-decomposing platinum precursor on the pore surface. Preferably, at least 90% of the solvent are removed by drying or the impregnated porous catalyst support(s) can just as well be dried until the weight remains constant. After the drying, the impregnated porous catalyst support(s) can be calcined at temperatures in the range of, for example, 150-600° C. The calcination can take place under atmospheric conditions and under inert gas conditions. An exothermic decomposition of the at least one exothermic-decomposing platinum precursor, while forming the at least one catalytically active platinum species, can take place during the calcination. The exothermic decomposition of the at least one exothermic-decomposing platinum precursor to form at least one catalytically active platinum species can take place in part or fully. The drying and the calcination can just as well take place in a common step.

The porous catalyst support(s) can basically consists of any material whose structure is stable at the temperatures of, for example, 0 to 600° C. or more, for example up to 1300° C., that occur on the oxidation catalyst during ongoing operation during the process according to the invention. In particular, the material of the porous catalyst supports can comprise or consist of refractory materials, for example of ceramic materials. Suitable refractory materials can be selected, for example, from the group consisting of aluminium oxides, titanium dioxide, cerium oxides, zirconium oxides, cerium/zirconium mixed oxides, zeolites, aluminium silicates (e.g. cordierite, mullite), silicon carbides, and silicon nitrides.

Said refractory materials can be present alone or in combination, for example as mixtures. Preferred refractory materials can be selected, for example, from the group of aluminium oxides, for example y-aluminium oxide. The refractory materials can comprise doping agents. Suitable doping agents can be selected from the group consisting of rare earth metals, transition metals, and alkaline earth metals. In particular, the doping agent can be at least one element selected from the group consisting of La, Ba, Sr, Zr, and Mn. The doping can serve, for example, to increase the temperature resistance of a porous aluminium oxide.

It is essential to the invention that the oxidation catalyst used in the process according to the invention was produced through the use of at least one exothermic-decomposing platinum precursor or, in other words and as is evident from what has been explained above, it is essential to the invention that the at least one catalytically active platinum species that is present as elemental platinum and/or as platinum compound (e.g. platinum oxide) on the pore surface of the porous catalyst support(s) was produced, at least in part, through the use of at least one exothermic-decomposing platinum precursor, in particular through the use of a solution thereof, and thus originates, at least in part, from the at least one exothermic-decomposing platinum precursor. It has been evident that the at least one oxidisable gaseous compound can then be removed from a gas mixture at a comparably low light-off temperature. If oxidation catalysts produced without the use of exothermic-decomposing platinum precursors were used, the light-off temperatures were found to be higher.

The at least one exothermic-decomposing platinum precursor is and/or was used in particular in the form of a solution, specifically in the form of an aqueous solution, for producing the oxidation catalyst and/or the porous catalyst support(s) with the at least one catalytically active platinum species.

The at least one exothermic-decomposing platinum precursor can, for example, be exothermic-decomposing platinum compounds selected from the group consisting of simple platinum salts, platinum complex salts, and neutral platinum complexes.

As mentioned above, the at least one exothermic-decomposing platinum precursor can be platinum precursors that can be decomposed exothermically in the temperature range of, for example, 50 to 500° C. or, for example, 150 to 200° C.

In one embodiment, preferred exothermic-decomposing platinum precursors show exclusively exothermic behaviour during their decomposition by heat in the temperature range of, for example, 50 to 500° C. or 150 to 200° C., i.e. the DSC diagram mentioned above shows exclusively exothermic signals in the corresponding temperature range.

In a further embodiment, preferred exothermic-decomposing platinum precursors can be decomposed by heat in the temperature range of, for example, 50 to 500° C. or 150 to 200° C. while releasing gaseous decomposition products.

In yet another further embodiment, preferred exothermic-decomposing platinum precursors can be decomposed by heat in the temperature range of, for example, 50 to 500° C. or 150 to 200° C. while releasing gaseous decomposition products and show exothermic behaviour exclusively.

Examples of preferred exothermic-decomposing platinum precursors include platinum oxalate complexes. Platinum oxalate complexes have been known for a long period of time.

Accordingly, Krogmann and Dodel reported the formula $(H_3O)_{1.6}[Pt(C_2O_4)_2]\cdot 2H_2O$ with platinum at a mean oxidation stage of 2.4 for a platinum oxalate complex in solid-state as early as in 1966. Platinum oxalate complexes are complex compositions that can be produced by reacting $H_2Pt(OH)_6$ with oxalic acid in aqueous solution. Aside from oxalate, the complexes can also contain water. Preferred platinum oxalate complexes and the production thereof are also described, for example, in WO2014/053351 A1, in which in particular platinum(IV) hydroxo acid and oxalic acid are used particularly preferably as starting substances and a suitable stoichiometric ratio is determined in that 1.8 to 2.8 molar equivalents of oxalic acid with respect to platinum in the form of the platinum precursor, i.e. the platinum (IV) hydroxo acid are added.

It is advantageous that the platinum oxalate complexes can be decomposed exothermically during their calcination while forming, aside from the catalytically active platinum species, basically no residues, in particular, for example, without developing toxic nitrogen oxides.

Commercially available in solution, for example, by HERAEUS by the name of "Pt EA", bis(ethanolammonium) hexahydroxoplatinum $[(HOCH_2CH_2NH_4)_2[Pt(OH)_6]$, hereinafter abbreviated as "platinum ethanolamine", is another example of a preferred exothermic-decomposing platinum precursor.

The production of an oxidation catalyst through the use of at least one exothermic-decomposing platinum precursor, such as, for example, platinum oxalate complexes and/or platinum ethanolamine, can involve, after the calcination, a reducing treatment of the catalyst as mentioned above. However, it is advantageous for this not to be required, which would be a significant simplification of the production process of the oxidation catalyst.

In one embodiment, aside from the at least one exothermic-decomposing platinum precursor, precursors of other metals or noble metals, in particular precursors of palladium, ruthenium and/or rhodium, can also be used and/or have been used for producing the oxidation catalyst used in the process according to the invention.

In another embodiment, aside from the at least one exothermic-decomposing platinum precursor, no precursors of other metals or noble metals can be used and/or have been used for producing the oxidation catalyst used in the process according to the invention.

In yet another embodiment, aside from the at least one, in particular just one, exothermic-decomposing platinum precursor, no non-exothermic-decomposing platinum precursors can be used and/or can have been used for producing the oxidation catalyst used in the process according to the invention, whereby precursors of metals or noble metals other than platinum can be and/or can have been used, though it is preferred for the latter not to be the case. Examples of non-exothermic-decomposing platinum precursors are endothermic-decomposing platinum precursors as well as platinum precursors that show neither exothermic nor endothermic behaviour in the DSC diagram mentioned above.

It is specifically preferred that the oxidation catalyst used in the process according to the invention can be and/or can have been produced through the exclusive use of platinum ethanolamine and/or platinum oxalate complexes, specifically through the exclusive use of platinum oxalate complexes, without the use of other precursors either of platinum or of other metals or noble metals.

As mentioned before, the oxidation catalyst used in the process according to the invention can be present in the form of one or more of the aforementioned porous catalyst support(s) and fixed-bed catalysts comprising at least one catalytically active platinum species, and can specifically be present in the following embodiments:

- as monolith catalyst, impregnated with a solution of the at least one exothermic-decomposing platinum precursor and calcined while forming the at least one catalytically active platinum species; the monolith as such is the porous catalyst support in this case;
- as monolith catalyst, provided with a washcoat layer calcined while forming the at least one catalytically active platinum species; the porous catalyst support particles inside the washcoat layer that are provided with the at least one catalytically active platinum species are the porous catalyst supports in this case;
- as monolith catalyst, impregnated with a solution of the at least one exothermic-decomposing platinum precursor and calcined while forming the at least one catalytically active platinum species and additionally provided with a washcoat layer calcined while forming the at least one catalytically active platinum species; the monolith as such as well as the porous catalyst support particles inside the washcoat layer that are provided with the at least one catalytically active platinum species are the porous catalyst supports in this case;
- as bulk catalyst with bulk form bodies, impregnated with a solution of the at least one exothermic-decomposing platinum precursor and calcined while forming the at least one catalytically active platinum species; the bulk form bodies as such are the porous catalyst supports in this case;
- as bulk catalyst with bulk form bodies, provided with a washcoat layer calcined while forming the at least one catalytically active platinum species; the porous catalyst support particles inside the washcoat layer that are provided with the at least one catalytically active platinum species are the porous catalyst supports in this case;
- as bulk catalyst with bulk form bodies, impregnated with a solution of the at least one exothermic-decomposing platinum precursor and calcined while forming the at least one catalytically active platinum species and additionally provided with a washcoat layer calcined while forming the at least one catalytically active platinum species; the bulk form bodies as such as well as the porous catalyst support particles inside the washcoat layer that are provided with the at least one catalytically active platinum species are the porous catalyst supports in this case;
- as metal honeycomb catalyst, provided with a washcoat layer calcined while forming the at least one catalytically active platinum species; the porous catalyst support particles inside the washcoat layer that are provided with the at least one catalytically active platinum species are the porous catalyst supports in this case;
- as metal mesh catalyst, provided with a washcoat layer calcined while forming the at least one catalytically active platinum species; the porous catalyst support particles inside the washcoat layer that are provided with the at least one catalytically active platinum species are the porous catalyst supports in this case;

EXAMPLES

The platinum oxalate complexes used in the examples were produced in accordance with WO2014/053351 A1, example 1. The platinum ethanolamine used in the examples is the aforementioned product distributed by HERAEUS.

Example 1 (production of an oxidation catalyst)

30 ml of an aqueous solution of platinum oxalate complexes (500 mg Pt in 30 ml of solution) were mixed with 100 g $Al_2O_3$ pellets (diameter 2-4 mm) in a rolling flask. The pellets were initially dried at 50° C. The thus impregnated and dried pellets where then calcined at 250° C. in a nitrogen atmosphere in a drying cabinet. Subsequently, this was cooled to room temperature.

Example 2

An oxidation catalyst was produced analogous to example 1, whereby an aqueous solution of platinum ethanolamine (500 mg Pt in 30 ml of solution) was used instead of the solution of platinum oxalate complexes.

Reference Example 3

An oxidation catalyst was produced analogous to example 1, whereby an aqueous nitric solution of platinum nitrate (500 mg Pt in 30 ml of solution) was used instead of the solution of platinum oxalate complexes.

Example 4

The oxidation catalysts produced in examples 1 to 3 were investigated in a catalyst test facility. For this purpose, 70 ml of each of the oxidation catalysts were installed in the reactor. A gas mixture of synthetic air containing 1,000 vol.-ppm methane and 1,000 vol.-ppm propane was guided over the oxidation catalysts at a rate of 10,000 $h^{-1}$. The quantitative fractions of methane and propane in the gas mixture were measured by gas chromatography upstream and downstream of the oxidation catalyst, and the turnover was thus determined. For the determination of the light-off temperature ($T_{50}$), the gas flow was guided over the oxidation catalyst at 600° C. and the turnover of methane and propane during a subsequent cooling phase was determined. The turnover curves thus obtained or analysed and the temperature $T_{50}$, at which the turnover was 50% was determined. The results of the measurements are summarised in the Table below.

| Oxidation catalyst from example | Pt precursor | $T_{50}$ [° C.] for $C_3H_8$ | for $CH_4$ |
|---|---|---|---|
| 1 | Platinum ethanolamine | 239 | 459 |
| 2 | Platinum oxalate complexes | 232 | 460 |
| 3 (see) | Platinum nitrate | 282 | 498 |

The invention claimed is:

1. A process for catalytic oxidative removal of at least one oxidisable gaseous compound from a gas mixture, the gas mixture comprising the at least one oxidisable gaseous compound as well as oxygen, the process comprising:
    reacting $H_2Pt(OH)_6$ with oxalic acid in an aqueous solution to form platinum oxalate complexes of the formula $(H_3O)_{1.6}[Pt(C_2O_4)_2] \cdot 2H_2O$;
    forming an oxidation catalyst by adding the platinum oxalate complexes to a porous catalyst support and exothermically decomposing the platinum oxalate complexes to generate catalytically active platinum species; and
    oxidizing the gas mixture with the oxidation catalyst, wherein
    the gas mixture is not a combustion flue gas.

2. The process according to claim 1, wherein the gas mixture is non-explosive.

3. The process according to claim 1, wherein the at least one oxidisable gaseous compound is a volatile organic compound (VOC).

4. The process according to claim 1, wherein the gas mixture does not contain any halogen-containing organic compounds.

5. The process according to claim 1, wherein the quantitative fraction of the at least one oxidisable gaseous compound contained in the gas mixture is in the range of 10vol.-ppb to 50,000 vol.-ppm.

6. The process according to claim 1, wherein the quantitative fraction of oxygen contained in the gas mixture is at least adequate, by stoichiometry, for complete oxidation of the at least one oxidisable gaseous compound.

7. The process according to claim 1, wherein the gas mixture contains at least one inert gas selected from the group consisting of nitrogen, noble gases, and $CO_2$.

8. The process according to claim 1, wherein the gas mixture is fed into the oxidation catalyst at a temperature in the range of 0 to 600° C.

9. The process according to claim 1, wherein the oxidation catalyst is a fixed-bed catalyst.

10. The process according to claim 1, wherein the oxidation catalyst is a washcoat-coated or uncoated monolith catalyst, a bulk catalyst comprising washcoat-coated or uncoated bulk form bodies or a washcoat-coated metal honeycomb or metal mesh catalyst.

11. The process according to claim 1, wherein the platinum content of the oxidation catalyst is 0.05 to 25 g per liter of catalyst volume.

12. The process according to claim 9, wherein the porous catalyst support comprises a refractory material.

13. The process according to claim 12, wherein the refractory material is selected from the group consisting of aluminium oxides, titanium dioxide, cerium oxides, zirconium oxides, cerium/zirconium mixed oxides, zeolites, aluminium silicates, silicon carbides, silicon nitrides, and any combinations thereof.

14. The process according to claim 1, wherein, aside from the platinum oxalate complexes, precursors of other metals or noble metals are also used in the production of the oxidation catalyst.

15. The process according to claim 1, wherein, aside from the platinum oxalate complexes, no precursors of other metals or noble metals are used for producing the oxidation catalyst.

16. The process according to claim 1, wherein the platinum oxalate complexes can be exothermically decomposed by heat in the temperature range of 50 to 500° C.

17. The process according to claim 1, wherein the platinum oxalate complexes can be exothermically decomposed by heat in the temperature range of 150 to 200° C.

* * * * *